US008862816B2

(12) United States Patent
Rajasingam

(10) Patent No.: US 8,862,816 B2
(45) Date of Patent: Oct. 14, 2014

(54) MIRRORING MULTIPLE WRITEABLE STORAGE ARRAYS

(75) Inventor: Narendren Rajasingam, Melbourne (AU)

(73) Assignee: International Business Machines Corporation, Armonk, NY (US)

( * ) Notice: Subject to any disclaimer, the term of this patent is extended or adjusted under 35 U.S.C. 154(b) by 709 days.

(21) Appl. No.: 12/695,334

(22) Filed: Jan. 28, 2010

(65) Prior Publication Data

US 2011/0185121 A1    Jul. 28, 2011

(51) Int. Cl.
*G06F 12/00* (2006.01)
*G06F 11/20* (2006.01)

(52) U.S. Cl.
CPC ........ *G06F 11/2064* (2013.01); *G06F 11/2079* (2013.01)
USPC ........... 711/114; 711/150; 711/151; 711/161; 711/162

(58) Field of Classification Search
None
See application file for complete search history.

(56) References Cited

U.S. PATENT DOCUMENTS

| | | | |
|---|---|---|---|
| 5,742,792 A | 4/1998 | Yanai et al. | |
| 5,933,653 A | 8/1999 | Ofek | |
| 6,065,102 A * | 5/2000 | Peters et al. | 711/151 |
| 6,163,856 A | 12/2000 | Dion et al. | |
| 6,279,078 B1 * | 8/2001 | Sicola et al. | 711/119 |
| 6,658,590 B1 | 12/2003 | Sicola et al. | |
| 6,745,303 B2 | 6/2004 | Watanabe | |
| 7,111,189 B1 | 9/2006 | Sicola et al. | |
| 7,188,272 B2 | 3/2007 | Bartfai et al. | |
| 7,340,490 B2 | 3/2008 | Teloh et al. | |
| 7,386,755 B2 | 6/2008 | Eguchi et al. | |
| 7,509,354 B2 * | 3/2009 | McGarvey | 1/1 |
| 7,519,851 B2 | 4/2009 | Kitamura | |
| 7,899,998 B1 * | 3/2011 | Katzer et al. | 711/151 |
| 2004/0064659 A1 | 4/2004 | Achiwa et al. | |
| 2004/0205414 A1 | 10/2004 | Roselli et al. | |
| 2005/0114291 A1 | 5/2005 | Becker-Szendy et al. | |
| 2007/0078988 A1 | 4/2007 | Miloushev et al. | |
| 2007/0234342 A1 | 10/2007 | Flynn, Jr. et al. | |
| 2008/0016301 A1 * | 1/2008 | Chen | 711/162 |
| 2008/0120478 A1 * | 5/2008 | Holt | 711/150 |
| 2008/0126723 A1 * | 5/2008 | Ashton et al. | 711/162 |
| 2008/0250221 A1 * | 10/2008 | Holt | 711/200 |
| 2009/0083443 A1 | 3/2009 | Ocko et al. | |

* cited by examiner

*Primary Examiner* — Matthew Bradley
*Assistant Examiner* — Daniel Tsui
(74) *Attorney, Agent, or Firm* — Griffiths & Seaton PLLC

(57) ABSTRACT

Systems, methods, and computer program products for mirroring dual writeable storage arrays are provided. Various embodiments provide configurations including two or more mirrored storage arrays that are each capable of being written to by different hosts. When commands to write data to corresponding mirrored data blocks within the respective storage arrays are received from different hosts at substantially the same time, write priority for writing data to the mirrored data blocks is given to one of the storage arrays based on a predetermined criterion or multiple predetermined criteria.

25 Claims, 2 Drawing Sheets

MIRRORING MULTIPLE WRITEABLE STORAGE ARRAYS

FIELD OF THE INVENTION

The present invention generally relates to computing systems, and more particularly relates to systems, methods, and computer program products for mirroring dual writeable storage arrays.

BACKGROUND OF THE INVENTION

Mirroring data in two or more data storage systems is used in many industries to protect the data in the event that one of the data storage systems is destroyed or becomes temporarily or permanently inoperable. In many systems, several hosts are capable of writing data to an "active" or read/write data storage system. As data is written to the active storage array, the data is also substantially simultaneously written to one or more "passive" or read only data storage systems in communication with the active data storage system. While this configuration is an effective way of mirroring data, the fact that these systems only include one active data storage system prevents these systems from operating more efficiently.

SUMMARY OF THE DESCRIBED EMBODIMENTS

A fundamental tenet of mirrored technology is to ensure that the data block in a mirrored pair will substantially always include identical data as its peer block in the paired storage system at the end of each write operation. As such, it is therefore desirable to provide methods, systems, and computer program products for mirroring multiple writeable storage arrays. Furthermore, other desirable features and characteristics of the present invention will become apparent from the subsequent detailed description of the invention and the appended claims, taken in conjunction with the accompanying drawings and this background of the invention.

Various embodiments provide a system for mirroring dual writeable storage arrays. One system comprises a first host computing device, a second host computing device coupled to the first host computing device, the first host computing device and the second host computing device arranged in a clustered file system configuration, a first storage array coupled to the first host computing device, and a second storage array coupled to the first storage array and the second host computing device. In this embodiment, the first storage array and the second storage array include corresponding blocks for storing data and mirror the data in the other respective corresponding block. Furthermore, the first storage array and the second storage array are configured to be simultaneously written to by the first host computing device and the second host computing device, respectively, and priority is given to the first storage array or the second storage array based on a predetermined criteria when the first storage array and the second storage array desire to simultaneously write data to a same respective corresponding block.

Other embodiments provide a method for mirroring data in dual writeable storage arrays. One method comprises receiving a first command, at a first storage array including a first data storage block, to write first data to the first data storage block and receiving a second command, at a second storage array including a second data storage block, to write second data to the second data storage block, the first data storage block and the second data storage block configured to mirror one another. The method further comprises writing one of the first data and the second data to both the first data storage block and the second data storage block based on a predetermined priority when the first command and the second command are received substantially simultaneously.

In further embodiments, computer program products for facilitating data compression are provided. One computer program product comprises a computer-readable storage medium having computer-readable program code portions stored therein. In one embodiment, the computer-readable program code portions comprise a first executable portion for writing first data to a first data storage block within a first storage array in response to receiving a first write command and a second executable portion for writing second data to a second data storage block within a second storage array in response to receiving a second write command, the first data storage block and the second data storage block configured to mirror one another. The computer-readable program code portions further comprise a third executable portion for writing one of the first data and the second data to both the first data storage block and the second data storage block based on a predetermined priority when the first write command and the second write command a received substantially simultaneously.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
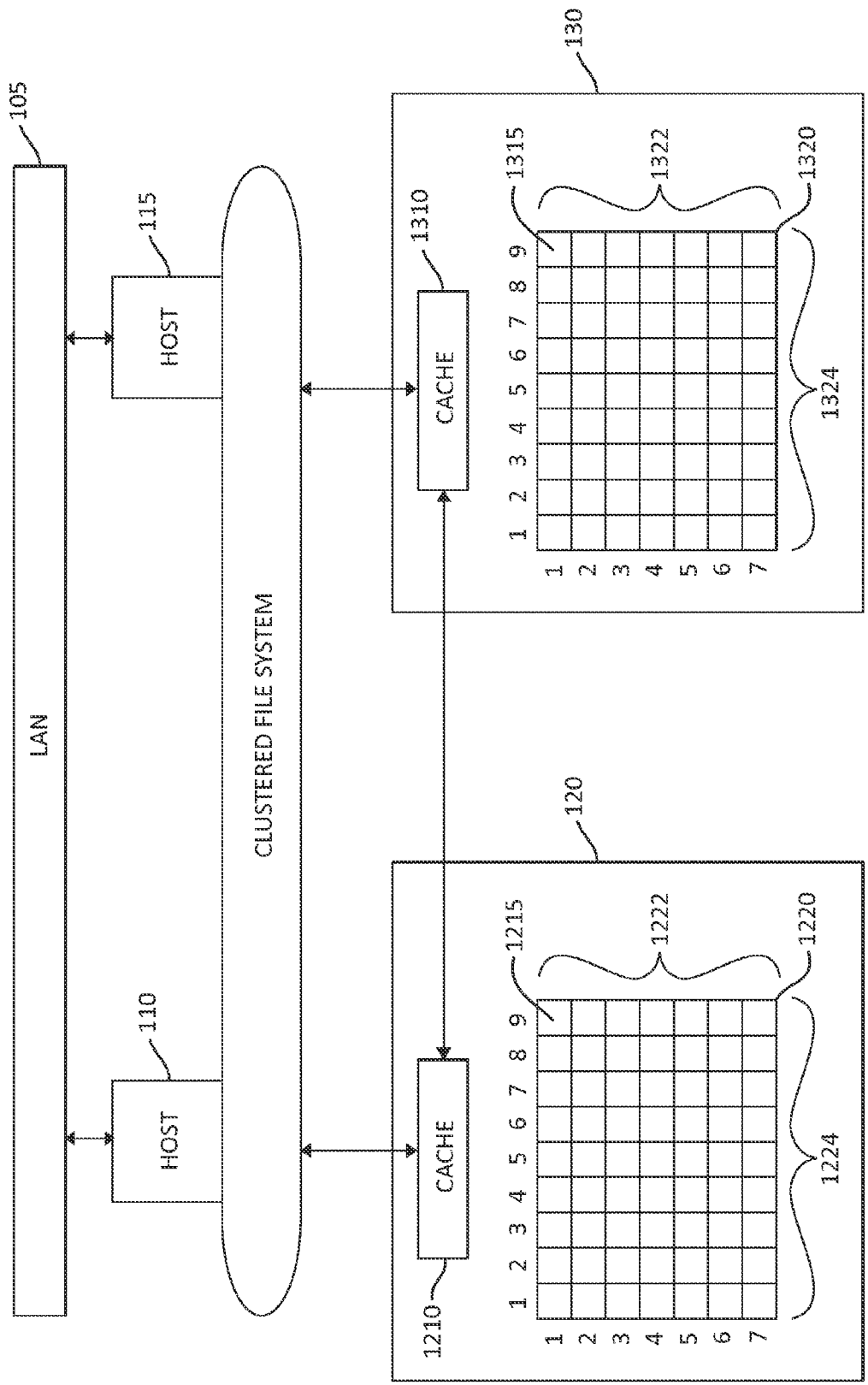
FIG. 1 is a block diagram of one embodiment of a system for mirroring data in a dual writeable storage array configuration.

Turning now to the figures, FIG. 1 is a block diagram of one embodiment of a system 100 for mirroring data in a dual writeable storage array configuration. At least in the illustrated embodiment, system 100 comprises a local area network (LAN) 105 coupled to at least two host computing devices (e.g., host 110 and 115) arranged as a clustered filed system. System 100 further comprises a data storage system 120 and a data storage system 130 coupled to host 110 and host 115, respectively, and are in communication with one another.

LAN 105 may be any type of local area network known in the art or developed in the future. Likewise, hosts 110 and 115 may be any type of computing device and/or system capable of functioning as a host computing device and/or system in a clustered file configuration.

Data storage system 120 comprises a cache memory 1210 and a plurality of blocks of storage or memory 1215 arranged in an array 1220 having one or more tracks 1222 (or rows) and one or more sectors 1224 (or columns) within one or more dimensions (e.g., pages, chapters, sections, folders, books, etc.). Data storage system 120 may include any amount of memory known in the art or developed in the future. That is, array 1220 may include any number of blocks of memory 1215, each of which may include any size that is known in the art or developed in the future. Array 1220 may refer to one or more physical, logic, or virtualized storage elements coupled together to present a plurality of memory addressable using terminology such as logical unit numbers (LUNs), cylinders, tracks, and sectors. Array 1220 may be formed of the same number of tracks and sectors of blocks of memory 1215 or may have a different number of tracks and sectors of blocks of memory 1215 as illustrated in the embodiment depicted in FIG. 1. As discussed above, data storage system 120 is configured to be in communication with data storage system 130. Data storage system 120 may include additional storage or memory not involved in the mirroring relationship between array 1220 and array 1320.

Data storage system 130 comprises a cache memory 1310 and a plurality of blocks of storage or memory 1315 arranged in an array 1320 having one or more tracks 1322 (or rows) and one or more sectors 1324 (or columns) within one or more dimensions (e.g., pages, chapters, sections, folders, books, etc.). Specifically, data storage system 130 includes the same number of blocks of memory 1315 as data storage system 120 and each block of memory 1315 in array 1320 includes a corresponding block of memory 1215 in array 1220 such that the data in the corresponding blocks of memory are mirrored in arrays 1220 and 1320. As such, array 1320 includes the same number of tracks 1322 and sectors 1324 as tracks 1222 and sectors 1224, respectively, in array 1220. Data storage array may also include additional storage or memory not involved in the mirroring relationship between array 1220 and array 1320.

With the arrangement discussed above, system 100 is able to substantially simultaneously write data to storage systems 120 and 130 while mirroring the data in the other respective data storage system. Specifically, as data is being written to a particular block of memory 1215 in array 1220 by host 110, the data is also being written (i.e., mirrored by data storage system 120) to data storage system 130 with instructions for the corresponding block of memory 1315 in array 1320 to be updated with the new data. Likewise, as data is being written to a particular block of memory 1315 in array 1320 by host 115, the data is also being written (i.e., mirrored by data storage system 130) to data storage system 120 with instructions for the corresponding block of memory 1215 in array 1220 to be updated with the new data. To substantially simultaneously write data to storage systems 120 and 130, caches 1210 and 1310 are configured to cooperate with one another in writing and mirroring data to their respective arrays 1220 and 1320.

Caches 1210 and 1310 are the components of the respective data storage systems 120 and 130 providing the function of caching data for rapid access. This function includes the physical memory, process code, and central processing unit tasked with maintaining this function. Coupled with this function, is peer to peer mirroring code to ensure that all data writes to locally paired data are also successfully written to the configured peer storage system. It is this function that implements the design of the present invention to enable multiple writable mirrored volumes. Subsequent references to caches 1210 and 1310 imply this definition.

Cache 1210 is configured to receive commands to write data various blocks of memory 1215 in array 1220. Cache 1210 is further configured to instruct cache 1310 to write (i.e., mirror) the data in the various corresponding blocks of memory 1315 in array 1320 upon receipt of the commands from host 110. Cache 1310 is configured to transmit acknowledgements of the instructions to cache 1210 and write the data to the various corresponding blocks of memory 1315 in array 1320 upon receipt of the instructions from cache 1210. Cache 1210 is configured to write the data to the various blocks of memory 1215 in array 1220 upon receipt of the acknowledgements of the instructions from cache 1310. Cache 1210 is then configured to transmit acknowledgements to host 110 after the data has been written to array 1220 and acknowledgements that the data has been written (i.e., mirrored) in array 1320 is received from cache 1310. Caches 1310 and 1210 operate similarly when cache 1310 receives a command to write data to array 1320 from host 115.

Similar to cache 1210, cache 1310 is configured to receive commands to write data various blocks of memory 1315 in array 1320. Cache 1310 is further configured to instruct cache 1210 to write (i.e., mirror) the data in the various corresponding blocks of memory 1215 in array 1220 upon receipt of the commands from host 115. Cache 1210 is configured to transmit acknowledgements of the instructions to cache 1310 and write the data to the various corresponding blocks of memory 1215 in array 1220 upon receipt of the instructions from cache 1310. Cache 1310 is configured to write the data to the various blocks of memory 1315 in array 1320 upon receipt of the acknowledgements of the instructions from cache 1210. Cache 1310 is then configured to transmit acknowledgements to host 115 after the data has been written to array 1320 and acknowledgements that the data has been written (i.e., mirrored) in array 1220 is received from cache 1210. In the event that data from both host 110 and 115 are simultaneously destined to be written to the same respective corresponding block of memory in arrays 1220 and 1320, caches 1210 and 1310 implement a predetermined priority to determine which of the data from host 110 or host 115 is to be successfully written to the corresponding blocks of memory. This is done to ensure that the tenet of ensuring the corresponding data blocks 1215 and 1315 in arrays 1210 and 1310, respectively, remain mirrored is observed, thus making the two blocks of memory behave essentially as one block, although they are physically separate from one another.

In one embodiment, data storage system 120 or data storage system 130 will always have priority when commands to write data to the same corresponding block of memory in arrays 1220 and 1320 are simultaneously received. That is, data from host 110 will always be written to the block of memory 1215 in array 1220 and mirrored in the corresponding block of memory 1315 in array 1320 if data storage system 120 always has priority. Likewise, data from host 115 will always be written to the block of memory 1315 in array 1320 and mirrored in the corresponding block of memory 1215 in array 1220 if data storage system 130 always has priority.

In another embodiment, the last data storage system to successfully write data to any block or dimension of memory, which is tracked (e.g., via a flag), has priority when commands to write data to the same corresponding block of memory in arrays 1220 and 1320 are simultaneously received. In this embodiment, data from host 110 will always be written to the block of memory 1215 in array 1220 and mirrored in the corresponding block of memory 1315 in array 1320 if data storage system 120 was the last data storage system to successfully write data to any of blocks of memory 1215. Likewise, data from host 115 will always be written to the block of memory 1315 in array 1320 and mirrored in the corresponding block of memory 1215 in array 1220 if data storage system 130 was the last data storage system to successfully write data to any of blocks of memory 1315.

In yet another embodiment, the last data storage system to successfully write data to its corresponding block of memory, which is tracked (e.g., via a flag), has priority when commands to write data to the same corresponding block of memory in arrays 1220 and 1320 are simultaneously received. In this embodiment, data from host 110 will always be written to the block of memory 1215 in array 1220 and mirrored in the corresponding block of memory 1315 in array 1320 if data storage system 120 was the last data storage system to successfully write data to its corresponding block of memory 1215. Likewise, data from host 115 will always be written to the block of memory 1315 in array 1320 and mirrored in the corresponding block of memory 1215 in array 1220 if data storage system 130 was the last data storage system to successfully write data to its corresponding block of memory 1315.

In still another embodiment, the last data storage system to successfully write data to the track or dimension that includes its corresponding block of memory, which is tracked (e.g., via a flag), has priority when commands to write data to the same corresponding block of memory in arrays 1220 and 1320 are simultaneously received. Here, data from host 110 will always be written to the block of memory 1215 in array 1220 and mirrored in the corresponding block of memory 1315 in array 1320 if data storage system 120 was the last data storage system to have previously successfully written to any data in the track including its corresponding block of memory 1215. Likewise, data from host 115 will always be written to the block of memory 1315 in array 1320 and mirrored in the corresponding block of memory 1215 in array 1220 if data storage system 130 was the last data storage system to have previously successfully written to any data in the track including its corresponding block of memory 1315.

In still yet another embodiment, the last data storage system to successfully write data to the sector or dimension that includes its corresponding block of memory, which is tracked (e.g., via a flag), has priority when commands to write data to the same corresponding block of memory in arrays 1220 and 1320 are simultaneously received. In this embodiment, data from host 110 will always be written to the block of memory 1215 in array 1220 and mirrored in the corresponding block of memory 1315 in array 1320 if data storage system 120 was the last data storage system to successfully write data to the sector or dimension including its corresponding block of memory 1215. Likewise, data from host 115 will always be written to the block of memory 1315 in array 1320 and mirrored in the corresponding block of memory 1215 in array 1220 if data storage system 120 was the last data storage system to successfully write data to the sector or dimension including its corresponding block of memory 1315.

Priority, in another embodiment, is based on a permission scheme. In this embodiment, data storage system 120 and data storage system 130 are arranged in a master/slave configuration. Here, the slave data storage system is required to ask for and receive permission from the master storage system prior to writing any data. In this manner, when commands to write data to the same corresponding block of memory in arrays 1220 and 1320 are simultaneously received, the master storage system is able to grant or deny permission to write data based on any predetermined factor as long as the tenet of ensuring the corresponding blocks of memory are identical is always adhered to.

Priority, in yet another embodiment, is based on a de facto priority scheme. That is, one of data storage systems 120 and 130 functions as a deferring data storage system and will defer initial processing of received write commands to the other non-deferring data storage system, which then processes the write command as if the write command were received from a host computer. Specifically, if data storage system 130 is the deferring data storage system, data storage system 130 is configured to transmit commands to write any data to various blocks of memory 1315 in array 1320 from host 115 to data storage system 120 for initial processing. Here, cache 1210 receives data from data storage system 130 as if storage data system 130 is a host. Cache 1210, the non-deferring cache, is configured to then instruct cache 1310 to write the data in the various blocks of memory 1315 in array 1320 upon receipt of the commands from data storage system 130. Cache 1310 is configured to transmit acknowledgements of the instructions to cache 1210 and write the data to the various blocks of memory 1315 in array 1320 upon receipt of the instructions from cache 1210. Cache 1210 is configured to write (i.e., mirror) the data to the various corresponding blocks of memory 1215 in array 1220 upon receipt of the acknowledgements of the instructions from cache 1310. Cache 1310 is further configured to transmit acknowledgements to cache 1210 once the data has been written locally. Cache 1210 is then configured to transmit acknowledgements to data storage system 130 indicating that the data has been written to array 1220 and that the data has been written (i.e., mirrored) to array 1320. Data storage system 130 is then configured to transmit acknowledgements to host 115 indicating that the data has been written and mirrored. Data storage system 120 is also capable of functioning as a deferring data storage system.

When data storage system 120 is the deferring data storage system, data storage system 120 is configured to transmit commands to write data to various blocks of memory 1215 in array 1220 from host 110 to data storage system 130 for initial processing. Here, cache 1310 receives data from data storage system 120 as if data storage system 120 is a host. Cache 1310, the non-deferring cache, is configured to then instruct cache 1210 to write the data in the various blocks of memory 1215 in array 1220 upon receipt of the commands from data storage system 120. Cache 1210 is configured to transmit acknowledgements of the instructions to cache 1310 and write the data to the various blocks of memory 1215 in array 1220 upon receipt of the instructions from cache 1310. Cache 1310 is configured to write the data to the various corresponding blocks of memory 1315 in array 1320 upon receipt of the acknowledgements of the instructions from cache 1210. Cache 1210 is further configured to transmit acknowledgements to cache 1310 once the data has been written locally. Cache 1310 is then configured to transmit acknowledgements to data storage system 120 indicating that the data has been written to array 1320 and that the data has been written (i.e., mirrored) to array 1220. Data storage system 120 is then configured to transmit acknowledgements to host 110 indicating that the data has been written to array 1220 and mirrored.

After priority policy has been established, system 100, in one embodiment, is configured to delete/ignore the write commands to the data storage system (or host) that does not have priority when processing write commands to the same blocks at substantially the same time. In this embodiment, the last write activity (and therefore the most recent data) in the corresponding memory blocks will belong to the data storage system that did have priority as only the priority writes were processed.

In still another embodiment, the write commands from the data storage system (or host) that does not have priority may be delayed processing until after the write commands from the data storage system (or host) that has priority have been processed (i.e., written to and mirrored in arrays 1220 and 1320). In this embodiment, the last write activity (and therefore the most recent data) in the corresponding memory blocks will belong to the data storage system that did not have priority as the priority writes were processed first. Either way, the fundamental tenant to ensure that both mirrored blocks have identical data after every write operation is being adhered to.

Figure 2:
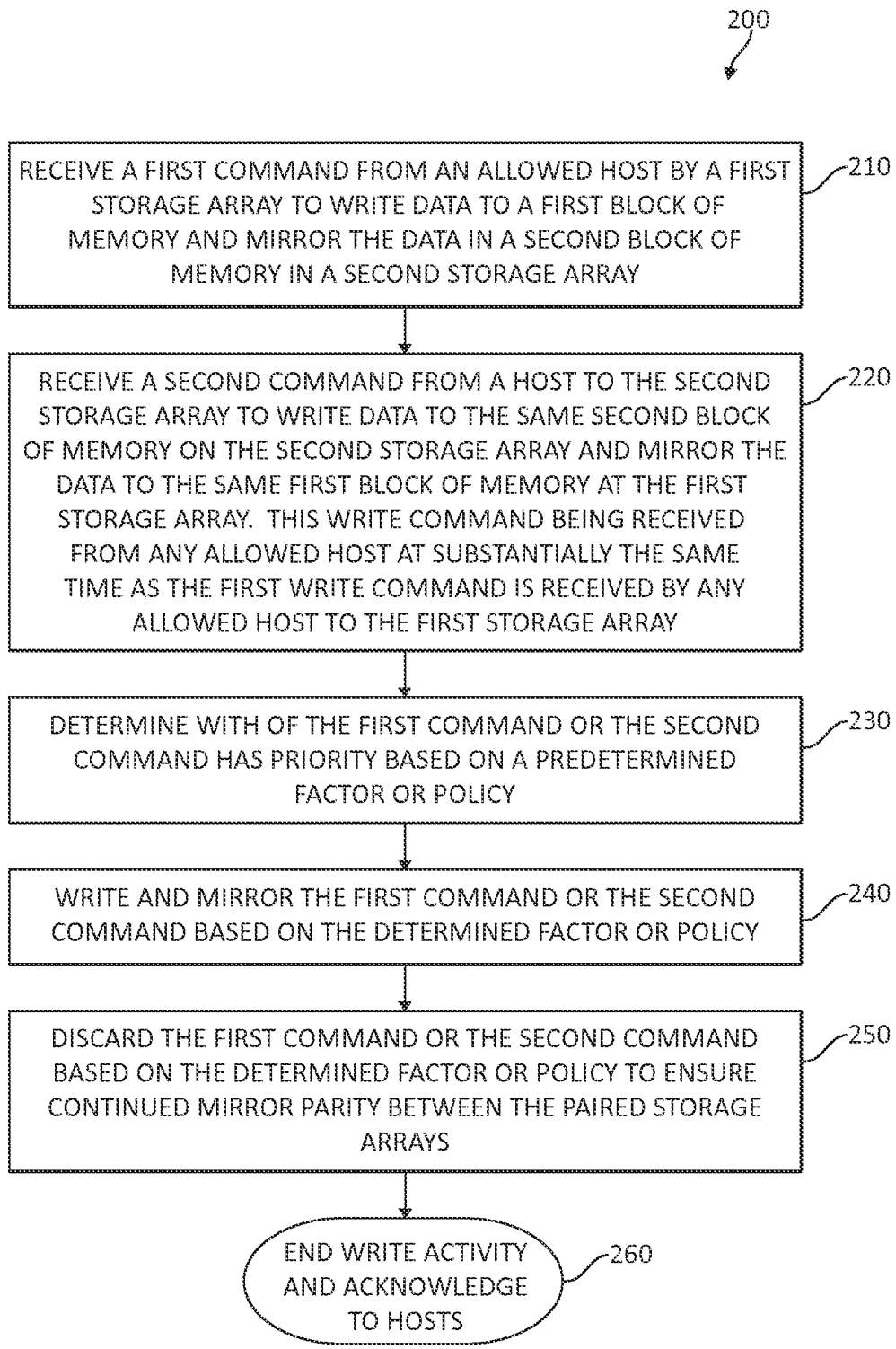
FIG. 2 is a flow diagram of one embodiment of a method for mirroring data in a dual writeable storage array configuration.

Turning now to FIG. 2, is a flow diagram of one embodiment of a method 200 for mirroring data in a dual writeable storage array system (e.g., system 100). At least in the illustrated embodiment, method 200 begins by receiving a first command, at a first cache (e.g., cache 1210), from a first host (e.g., host 110) to write data to a first block of memory (e.g., a block of memory 1215) in a first array (e.g., array 120) and mirror the data in a corresponding second block of memory (e.g., a block of memory 1315) in a second array (e.g., array 130) (block 210), and receiving a second command, at a second cache (e.g., cache 1310), from a second host (e.g., host 115) to write different data to the second block of memory 1315 and mirror the data in the corresponding first block of memory 1215 at substantially the same time (block 220).

When the first command and second command are received at substantially the same time, method 200 includes determining which of the first command and the second command has priority based on predetermined factors (block 230). In one embodiment, the first command or the second command will always have priority because it is being written to first array or second array, respectively. In another embodiment, the first command or the second command will always have priority because the commands are from host 110 or host 115, respectively.

Priority, in other embodiments, is given to the first command or the second command based on which of array 120 or 130 was last written to, which of block 1215 or 1315 was last written to, which track including block 1215 or 1315 was last written to, which sector including block 1215 or 1315 was last written to, and/or the like factors discussed above. In yet another embodiment, priority is based on a permission scheme between arrays 120 and 130 similar to the discussion above. In still another embodiment, priority is based on a de facto scheme between arrays 120 and 130 similar to the discussion above.

After priority is determined, method 200 includes writing the data in the first command to block of memory 1215 and mirroring the data in the first command in block of memory 1315, or writing the data in the second command to block of memory 1315 and mirroring the data in the second command in block of memory 1215 (block 240). Method 200 further comprises either discarding whichever of the first command and the second command that was determined to not have priority or writing the non-priority data and mirroring it after the priority data has been written and mirrored (block 250).

An optimization of the method in block 240 may include either writing the priority data or the non-priority data based on the selection policy determined in block 230. Subsequently, in block 250, the data block that was not selected for writing and mirroring will be discarded. Method 200 concludes when the writing and mirroring activities have concluded and have been acknowledged to the host computer(s) (block 260).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, crystal, polymer, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program or data for use by or in connection with an instruction execution system, apparatus, or device.

Program code embodied on a computer readable medium may be transmitted using any appropriate medium, including but not limited to wireless, wired, optical fiber cable, radio frequency (RF), etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A system for mirroring dual writeable storage arrays, comprising:
    a first host computing device;
    a second host computing device coupled to the first host computing device, the first host computing device and the second host computing device arranged in a clustered file system configuration;
    a first storage array coupled to the first host computing device;
    a second storage array coupled to the first storage array and the second host computing device;
    a first cache in communication with the first host computing device; and
    a second cache in communication with the second host computing device and the first cache,
    wherein:
        the first storage array and the second storage array include corresponding blocks for storing data and mirroring the data in the other respective corresponding block,
        the first storage array and the second storage array are configured to be written to by the first host computing device and the second host computing device, respectively,
        the first cache is configured to receive commands from the first host computing device to write first data to the first storage array and to instruct the second cache to write the first data to corresponding portions of the second storage array,
        substantially simultaneously with the first cache receiving commands from the first host computing device to write the first data to the first storage array, the second cache is configured to receive commands from the second host computing device to write second data to the second storage array while the first data is being written to the first storage array and to instruct the first cache to write the second data to corresponding portions of the first storage array,
        in response to substantially simultaneously receiving commands from the first host computing device to write the first data to the first storage array and receiving commands from the second host computing device to write second data to the second storage array, the first cache and the second cache are configured to give priority to one of the first storage array or the second storage array based on a predetermined criterion where priority is given to the storage array including a flag identifying the corresponding storage array as being the storage array that was last written to,
        as the first data is being written to a particular block in the first storage array by a corresponding host, the first data is also being substantially simultaneously mirrored from the first storage array to the second storage array, and
        as the second data is being written to a particular block in the second storage array by a corresponding host, the second data is also being substantially simultaneously mirrored from the second storage array to the first storage array.

2. The system of claim 1, wherein the predetermined criterion is whichever of the first storage array and the second storage array that last wrote to its respective corresponding block.

3. The system of claim 1, wherein:
    the first storage array and the second storage array comprise respective corresponding tracks including its respective corresponding block, and
    the predetermined criterion is whichever of the first storage array and the second storage array includes the respective corresponding track that was last written to.

4. The system of claim 1, wherein:
    the first storage array and the second storage array comprise respective corresponding sectors including its respective corresponding block, and
    the predetermined criterion is whichever of the first storage array and the second storage array includes the respective corresponding sector that was last written to.

5. The system of claim 1, wherein the predetermined criterion is whichever of the first storage array and the second storage array that was last written to.

6. The system of claim 1, wherein the predetermined criterion is the first storage array always has priority or the second storage array always has priority.

7. A method for mirroring data in dual writeable storage arrays, comprising:

receiving a first command at a first cache in communication with a first storage array including a first data storage block, to write first data to the first data storage block;

sending instruction from the first cache to a second cache in communication with a second storage array including a second data storage block to write the first data to the second storage block of the second storage array, the first data storage block and the second data storage block configured to mirror one another;

substantially simultaneously with the first cache receiving the first command to write the first data to the first data storage block, receiving a second command at the second cache to write second data to the second data storage block while the first data is being written to the first data storage block;

sending instruction from the second cache to the first cache to write the second data to the first data storage block of the first storage array, the first data storage block and the second data storage block configured to mirror one another; and in response to substantially simultaneously receiving the first command to write the first data and receiving the second command to write the second data, prioritizing writing one of the first data and the second data to one of the first data storage block and the second data storage block based on a predetermined priority or a predetermined policy, where priority is given to the storage array including a flag identifying the corresponding storage array as being the storage array that was last written to, wherein:

as the first data is being written to the first data storage block in the first storage array, the first data is also being substantially simultaneously mirrored from the first storage array to the second storage array; and as the second data is being written to the second data storage block in the second storage array, the second data is also being substantially simultaneously mirrored from the second storage array to the first storage array.

8. The method of claim 7, further comprising discarding the one of the first data and the second data that was not written to both the first data storage block and the second data storage block based on the predetermined priority or the predetermined policy.

9. The method of claim 8, wherein writing comprises always writing the first data from the first data storage block and discarding comprises always discarding the second data from the second data storage block.

10. The method of claim 7, wherein writing comprises always discarding the first data from the first data storage block or always discarding the second data from the second data storage block.

11. The method of claim 7, wherein:

the first data storage block is included within a first track or first dimension of data blocks within the first storage array and the second data storage block is included within a second track or second dimension of data blocks within the second storage array; and writing comprises writing the first data if the first track or first dimension was last written to or writing the second data if the second track or second dimension was last written to.

12. The method of claim 7, wherein:

the first data storage block is included within a first sector or first dimension of data blocks within the first storage array and the second data storage block is included within a second sector or second dimension of data blocks within the second storage array; and writing comprises writing the first data if the first sector or first dimension was last written to or writing the second data if the second sector or second dimension was last written to.

13. The method of claim 7, wherein writing comprises writing and mirroring the first data if the first storage array was last written to or writing and mirroring the second data if the second storage array was last written to.

14. The method of claim 7, wherein writing comprises discarding the first data and mirroring the second data if the first storage array was last written to or discarding the second data and mirroring the first data if the second storage array was last written to.

15. The method of claim 7, wherein writing comprises writing and mirroring the first data if the first data storage block was last written to or writing and mirroring the second data if the second data storage block was last written to.

16. The method of claim 7, wherein writing comprises discarding the first data and mirroring the second data if the first data storage block was last written to or discarding the second data and mirroring the first data if the second data storage block was last written to.

17. The method of claim 7, further comprising:

after writing the one of the first data and the second data, writing the other respective one of the first data and the second data to both the first data storage block and the second data storage block when the first command and the second command are received substantially simultaneously.

18. A computer program product for facilitating data compression, the computer program product comprising a non-transitory computer-readable storage medium having computer-readable program code portions stored therein, the computer-readable program code portions comprising:

a first executable portion for writing first data to a first data storage block within a first storage array in response to receiving a first write command from a first cache in communication with the first storage array;

a second executable portion for sending instruction from the first cache to a second cache in communication with a second storage array including a second data storage block to write the first data to the second data storage block of the second storage array, the first data storage block and the second data storage block configured to mirror one another;

a third executable portion for, substantially simultaneously with the first cache receiving the first write command from the first cache to write the first data to the first data storage block, writing second data to the second data storage block within a second storage array in response to receiving a second write command at the second cache while the first data is being written to the first data storage block;

a fourth executable portion for sending instruction from the second cache to the first cache to write the second data to the first storage block of the first storage array, the first data storage block and the second data storage block configured to mirror one another;

a fifth executable portion for, in response to substantially simultaneously receiving the first command to write the first data and receiving the second command to write the second data, prioritizing writing one of the first data and the second data to one of the first data storage block and the second data storage block based on a predetermined priority where priority is given to the storage array including a flag identifying the corresponding storage array as being the storage array that was last written to;

a sixth executable portion for, as the first data is being written to the first data storage block in the first storage array, substantially simultaneously mirroring the first data from the first storage array to the second storage array; and a seventh executable portion for, as the second data is being written to the second data storage block in the second storage array, substantially simultaneously mirroring the second data from the second storage array to the first storage array.

19. The computer program product of claim 18, wherein the predetermined priority comprises always writing the first data or always writing the second data.

20. The computer program product of claim 18, wherein:
   the first data storage block is included within a first track and a first sector of data blocks within the first storage array;
   the second data storage block is included within a second track and a second sector of data blocks within the second storage array; and
   the predetermined priority comprises one of:
      writing the first data if the first track was last written to or writing the second data if the second track was last written to, and
      writing the first data if the first sector was last written to or writing the second data if the second sector was last written to.

21. The computer program product of claim 18, wherein the predetermined priority comprises writing the first data if the first storage array was last written to or writing the second data if the second storage array was last written to.

22. The computer program product of claim 18, further comprising an eighth executable portion for discarding the first data and mirroring the second data if the first storage array was last written to or discarding the second data and mirroring the first data if the second storage array was last written to.

23. The computer program product of claim 18, wherein the predetermined priority comprises writing and mirroring the first data if the first data storage block was last written to or writing and mirroring the second data if the second data storage block was last written to.

24. The computer program product of claim 18, further comprising an eighth executable portion for discarding the first data and mirroring the second data if the first data storage block was last written to or discarding the second data and mirroring the first data if the second data storage block was last written to.

25. The computer program product of claim 18, further comprising:
   an eighth executable portion for, after the one of the first data and the second data is written to both the first data storage block and the second data storage block, writing the other respective one of the first data and the second data to both the first data storage block and the second data storage block when the first write command and the second write command are received substantially simultaneously.

* * * * *